United States Patent
Chu et al.

(10) Patent No.: US 10,942,814 B2
(45) Date of Patent: Mar. 9, 2021

(54) METHOD FOR DISCOVERING DATABASE BACKUPS FOR A CENTRALIZED BACKUP SYSTEM

(71) Applicant: EMC IP Holding Company LLC, Hopkinton, MA (US)

(72) Inventors: Wei Chu, Oakville (CA); Xinyan Zhang, Oakville (CA); Kenneth Owens, Burlington (CA); Adrian Dobrean, Oakville (CA); Daniel Wolski, Mississauga (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 192 days.

(21) Appl. No.: 16/051,294

(22) Filed: Jul. 31, 2018

(65) Prior Publication Data
US 2020/0042395 A1 Feb. 6, 2020

(51) Int. Cl.
| | |
|---|---|
| *G06F 17/00* | (2019.01) |
| *G06F 11/14* | (2006.01) |
| *G06F 11/34* | (2006.01) |
| *G06F 16/242* | (2019.01) |
| *G06F 16/2455* | (2019.01) |
| *G06F 16/11* | (2019.01) |

(52) U.S. Cl.
CPC ...... *G06F 11/1451* (2013.01); *G06F 11/1464* (2013.01); *G06F 11/3466* (2013.01); *G06F 16/2445* (2019.01); *G06F 16/24552* (2019.01); *G06F 16/128* (2019.01)

(58) Field of Classification Search
CPC ............. G06F 11/1451; G06F 11/1464; G06F 11/3466; G06F 11/1458; G06F 11/14; G06F 11/16; G06F 16/2445; G06F 16/24552; G06F 16/128; G06F 2201/80
See application file for complete search history.

(56) References Cited

U.S. PATENT DOCUMENTS

| | | | | |
|---|---|---|---|---|
| 7,734,594 | B2 * | 6/2010 | Wang | G06F 11/1461 707/644 |
| 2013/0326279 | A1 * | 12/2013 | Chavda | G06Q 10/06315 714/41 |
| 2015/0317213 | A1 * | 11/2015 | Lin | G06F 11/1469 707/679 |
| 2015/0324255 | A1 * | 11/2015 | Kochunni | G06F 3/065 711/162 |

* cited by examiner

*Primary Examiner* — Greta L Robinson
(74) *Attorney, Agent, or Firm* — Womble Bond Dickinson (US) LLP

(57) ABSTRACT

In an embodiment, described herein is a system and method for discovering backups of a database running on a database host, for use by a centralized backup system to validate backup compliance. A report agent executing on the database host can implement a discovery process configured to gather metadata for the backups of the database from a number of dynamic performance views of the database. The metadata is recorded in a control file of the database, and can include one or more commands used by the backup tool to create the backups. The report agent can categorize the metadata into one or more groups based on the backup commands, map backup files associated with each backup to that backup, create a backup report to describe the mapping information and additional information for each backup, and send the backup report to the centralized backup system.

21 Claims, 5 Drawing Sheets

METHOD FOR DISCOVERING DATABASE BACKUPS FOR A CENTRALIZED BACKUP SYSTEM

FIELD OF THE INVENTION

Embodiments of the present invention relate generally to data storage systems. More particularly, embodiments of the invention relate to a system and method for discovering database backups for a centralized backup system.

BACKGROUND

Copy data can include copies for data protection analytics, operations as well as testing and development. As a primary driver of data growth, copy data has significantly driven up storage costs for organizations. Accordingly, centralized backup systems are used to provide global management and monitoring of data copies/snapshots across primary and backup storages, to address growing challenges of data sprawl.

As part of managing and monitoring data copies, a centralized backup system needs to discover backups and validate backup compliance, which requires discovery of backups on a data domain, e.g., EMC backup storage.

However, sometimes backups, e.g., Oracle online backups, are stream-based, and include multiple backup files in a proprietary format which does not save interdependencies among them. Those interdependencies are calculated and searched dynamically during restore, e.g., Oracle RMAN restore. Prior to identifying the interdependencies among them, these backups are not immediately useful for compliance validation purposes. With the availability of self service on a centralized backup system, the type of backups are increasing in volume. Therefore, there is a need for discovering this type of backups and their related information for backup compliance validation.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
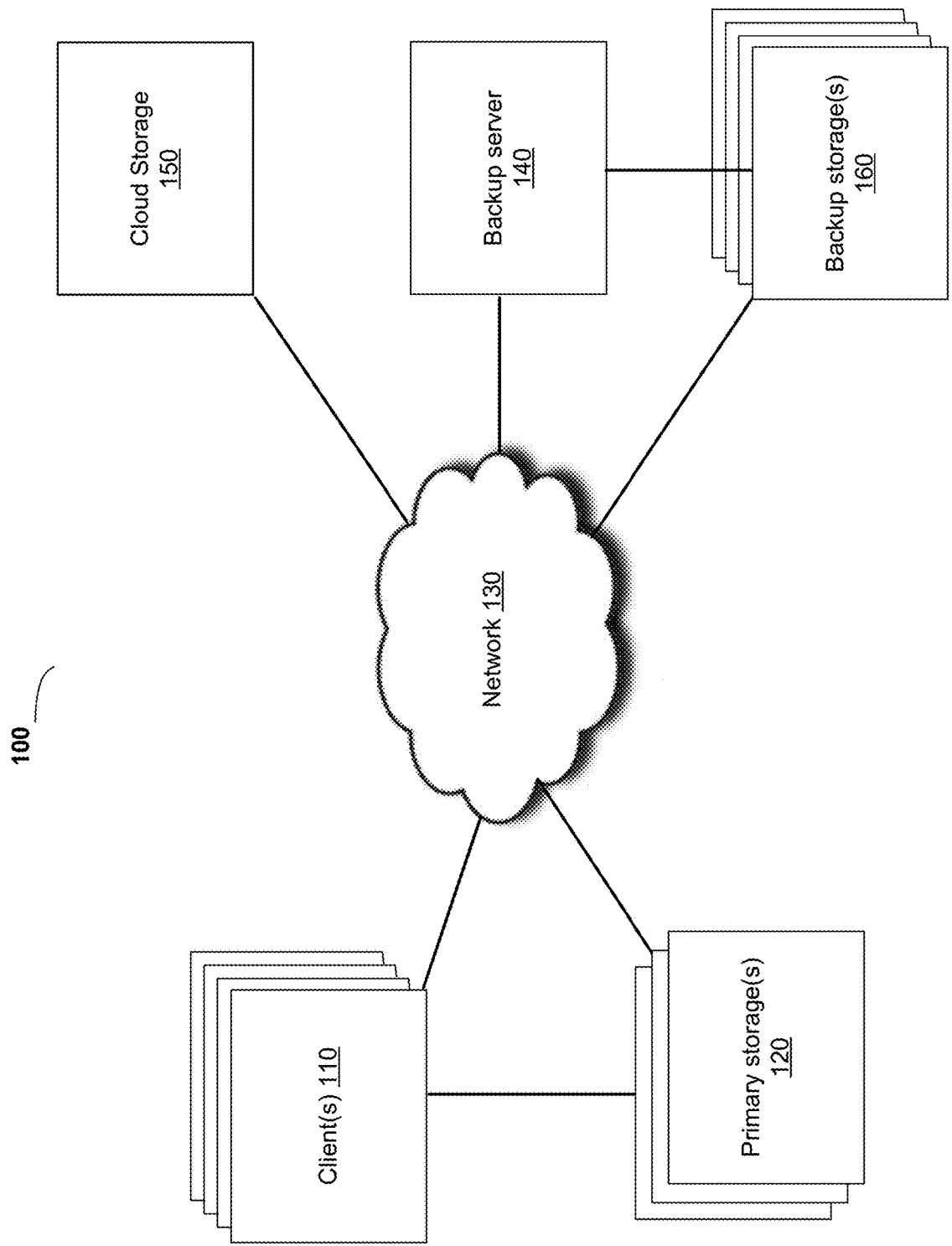
FIG. 1 illustrates, in block diagram form, an overview of an infrastructure that enables a user to access, view, or restore a data object to which the user has security access, from a backup of a plurality of data objects, in accordance with some embodiments.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to various embodiments, described herein are systems and methods for discovering online backups or offline backups created by a database backup tool for use by a centralized backup system to validate backup compliance.

In an embodiment, a report agent can be provided on a database host to collect metadata of backups of a database running on the database host. The metadata resides in a number of dynamic performance views for the database, and is generated when a database backup tool performs backup operations on the database. Each backup can include one or more backup files, e.g., backup pieces generated by Recovery Manager (RMAN). Backup files for all backups can be recorded in a control file of the database. The report agent can first connect to the database and, based on the connection, retrieve information describing the backup files, including backup commands used to generate the backups.

The report agent can categorize the backup files into one more groups based on the backup commands to make sure each group is self-contained or its interdependencies on other group can be explicitly identified by the centralized backup system, and each group can correspond to a backup. The report agent can generate a backup report based on the one more groups to map the retrieved backup files to their respective backups. The backup report can be transmitted to a compliance validation module in the centralized backup system for use in backup compliance validation.

In an embodiment, the backup report can be in a variety of formats, including JavaScript Object Notation (JSON), XML, or plain text. The backup report can map backup files for each backup to that backup; and can include additional information for each backup. The additional information for a backup can include a backup type and backup level for the backup, a start time when a backup command was run to generate the backup, an end time when the backup command was completed, and a session key of a backup command in a particular backup session.

The backup report can also include a start SCN (system change number) and an end SCN of each backup. The information in the backup report can be used by a backup compliance validation module in the centralized backup system to identify all interdependent backups and determine whether a particular backup plan or policy has been satisfied.

In an embodiment, when a same backup command was run multiple times to generate multiple backups at different times, backup files related to different runs of the same backup command are categorized into different groups.

In an embodiment, a SQL statement can be executed by the report agent to retrieve information (metadata) for backup files from the dynamic performance views, each dynamic performance views being a virtual table. A backup discovery algorithm can be implemented by the report agent to perform operations for gathering the metadata, categorizing the metadata, creating a backup report based on the categorized metadata, and send the backup report to the centralized backup system.

Embodiments described in the disclosure can be used to discover online backups, offline backups, or backups in another backup mode. Throughout the disclosure, Oracle database is used as an example database, Oracle Recovery Manager (RMAN) is used as an example backup tool, and EMC Enterprise Copy Data Management (eCDM) is used as an example centralized backup system. However, it would be appreciated that various other databases, database backup/recovery tools, and centralized backup systems can be similarly used to implement various embodiments in this invention.

Storage Infrastructure

FIG. 1 illustrates an overview of an infrastructure 100 that enables a user to access, view, or restore a data object to which the user has security access, from a backup of a number of data objects, in accordance with some embodiments.

In an embodiment, the infrastructure 100 can include one or more clients 110, one or more primary storages 120, a backup server 140, a cloud storage 150, and one or more backup storages 160 interconnected via network 130.

Clients 110 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Clients 110 may store data to a primary storage system 120, which may periodically back up the content stored therein to a backup storage system (e.g., a disaster recovery site or system), such as the backup storage 160 or the cloud storage 150.

The network 130 may be any type of network such as a local area network (LAN), a wide area network (WAN) such as the Internet, a fiber network, a storage network, or a combination thereof, wired or wireless.

The client 110 can backup or restore one or more data objects, files, images of a file system, or virtual disks of a virtual machine, LUNs, or other data units stored on the primary storage 120 to or from the backup storage 160. The backup server 140 can optionally facilitate a backup of a data object from the primary storage 120 to the backup storage 160, or the restoration of the data object from the backup storage 160 to the primary storage 120.

The primary storage 120, the backup storage 160, and the cloud storage 150 can each comprise a number of storage appliances having a large number of disks, such as a storage area network (SAN) storage. In an embodiment, a virtual disk can be a raw virtual disk mapped to one or more portions of storage. A portion of the primary storage 120 can comprise one or more logical unit numbers (LUNs) of a single physical disk or one or more physical disks. In an embodiment, a raw disk can be configured to use virtual mapping to one or portions of storage, such that the portions of storage can be snapshot before a backup. In an embodiment, a raw virtual disk can be physically mapped to one or more portions of storage.

In an embodiment, a backup of a data object stored on the primary storage 120 can be initiated by a user of the client 110, by the backup server 140, or by the backup storage 160. A data object being backed up may be compressed or deduplicated by a microservice on the backup server 140, the cloud storage 150, or the backup storage 160 before the data object is stored. A data object being backed up can comprise data to be backed up and metadata describing the data object. The metadata of the data object can include security attributes required to access, save, read, write, or execute the data object, a create date, modification date, size, filename of the data object, and other data object attributes. Each backup of a number of data objects may include the plurality of data objects, metadata for each data object, and metadata describing the backup. Metadata describing the backup can include a backup policy, one or more clients 110 whose data is being backed up, a data and time of the backup, the total size and number of data objects in the backup, a storage media type for the backup, and other attributes of the backup.

In an embodiment, scheduled backups can be initiated by the backup server 140. The backup server 140 can initiate a backup or restore of data objects stored on the primary storage 120 in accordance with one or more backup policies associated with the client 110. The client 110 and any of the backup server 140, the cloud storage 150, and the backup storage 160 can implement a lightweight service, such as a microservice, that facilitates restoration of a data object in a backup data set having a plurality of data objects, from backup storage 160 or cloud storage 150 to primary storage 120.

Figure 2:
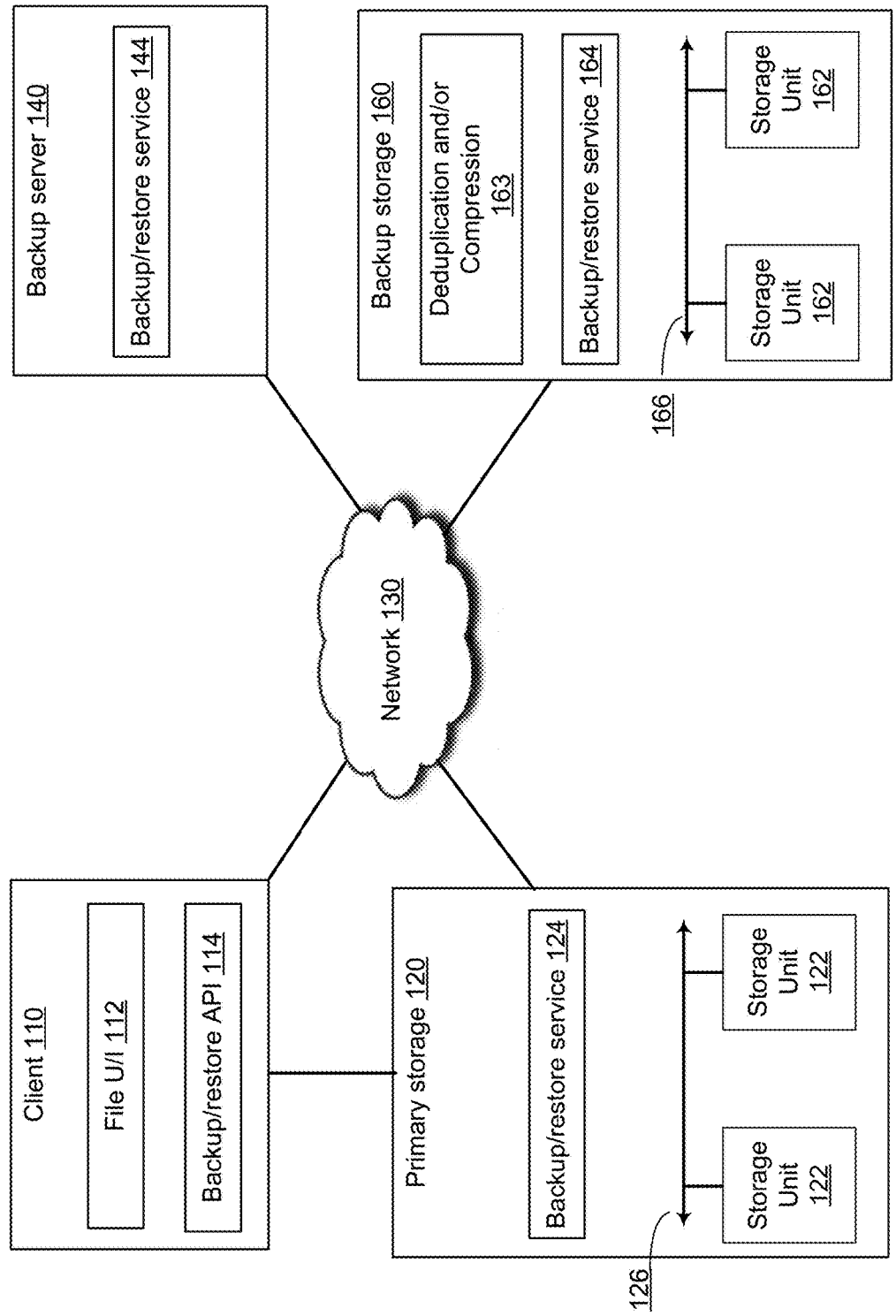
FIG. 2 illustrates, in block diagram form, a detailed view of an infrastructure that enables a user to access, view, or restore a data object to which the user has security access, from a backup of a variety of data objects, in accordance with some embodiments.

FIG. 2 illustrates, in block diagram form, a detailed view of an infrastructure 100 that enables a user to access, view, or restore a data object to which the user has security access, from a backup of plurality of data objects, in accordance with some embodiments.

In an embodiment, the client 110 can include a variety of file systems, such as NFS (Unix) or NTFS, FAT, or FAT32 (Windows), CD-ROM file system (CDFS), universal disk format (UDF), resilient file system (ReFS), extended FAT (exFAT), common Internet file system (CIFS) protocol, and direct access file system protocol, etc.

As shown in FIG. 2, a number of microservices 114, 124, 144, and 164 can be implemented using an application framework, an application programming interface (API), one or more operating system services, or applications. The backup server 140, the cloud storage 150, and the backup storage 160 can also be implemented using hardware.

In an embodiment, files stored in a file system in the client 110 and the primary storage 120 can have security attributes that determine which user(s), group(s) of users, or device(s) can access a particular data object in the client file system. Accessing a data object can include reading, writing, executing, renaming, copying, deleting, or other access to the file. A file user interface 112 on the client 110 can be used to read, write, execute, rename, add, delete, modify, and display files in the client file system of the client 110. Data objects can have metadata including the foregoing access security attributes, a file name, directory, parent directory, date of creation, date of last modification, a file size, an owner, and other file metadata. The backup/restore API 114 can implement a microservice that can extract metadata including file security attributes, and convert the metadata into a universal access control list (UACL) format for use by the backup server 140 and/or the backup storage 160.

In an embodiment, data objects in the client 110 file system can include a file, directory, inode of a file system, image backup of the client, including virtual machine images, system dump, or other data object. The backup/restore API 114 can convert data objects into, and out of, a universal data object format for use by the backup server 140 and/or the backup storage 160. The client backup/restore API 114 can be implemented using an API, framework, one or more operating system services, and inter-processing communication, messages, and other operating system functions.

The primary storage 120 can store data objects of the client 110 using the backup/restore service 124 and one or more storage units 122. The primary storage 120 can be a storage appliance that comprises processors, memory, and physical storage units 122 interconnected by a backplane 126 or a high-speed network 126. The primary storage 120 can implement one or more file systems, such as NFS, FAT, FAT32, NTFS, and the like. The backup/restore service 124 can perform one or more of the features of the client backup/restore API 114. The backup/restore service 124 can perform both backup and restore functionality and can expose some or all of its functionality to the backup server 140 and/or the backup storage 160 via an API or framework. The backup server 140 and/or the backup storage 160 can call the primary storage 120, invoking features within the backup/restore service 124 to perform backup functionality, such as taking a snapshot of the data objects to be backed up and facilitating backup of the snapshot to the backup storage 160. A snapshot of data to be backed up can include a list of data objects to be backed up, the time at which the snapshot was taken, and attributes of the data objects to be backed up. Data objects can be files, directories, logical unit numbers (LUNs), disk partitions, virtual machine images, file system images, or other data objects.

In one embodiment, the backup/restore service 124 can receive a list of data objects to be backed up, from the backup/restore service 144 or the backup/restore service 164. The primary storage 120 can use the backup/restore service 124 to interface with the backup server 140 and/or the backup storage 160 to backup each data object to the backup storage 160. The backup/restore service 144 can include some or all of the functionality of the backup/restore service 124 on the primary storage 120 and the backup/restore service 114 on the client 110. The performance of the client 110 and the primary storage 120 can be increased by offloading some or all of the functionality of the backup/restore API 114 and/or the backup/restore service 124 to the backup/restore service 144. The backup server 140 can access one or more storage policies for a backup. Each backup policy can determine a time interval at which a backup is performed, whether the backup is incremental or a full backup, the type of storage to which the backed up data objects are to be stored, whether the data is to be compressed or deduplicated, and how long the backup is to be stored.

In an embodiment, the backup server 140 can pass the information in the backup policies to the backup/restore service 124 on the primary storage 120, and request that the primary storage 120 take a snapshot of data objects that match one or more backup criteria. The backup/restore service 144 can receive a list of data objects to be backed up from the backup/restore service 124, and metadata (e.g., security attributes) of each data object in the list.

In an embodiment, the backup storage 160 can include a deduplication and compression engine 163, a restore service 164, and one or more physical storage units 162 interconnected via a backplane or network 166. The backup storage 160 can further include one or more hardware processors, memory, backplane or high-speed network 166, and other hardware and software to implement the described functionality. The Backup/restore service 164 can implement some, or all, of the functionality of the backup/restore service 144.

In an embodiment, the backup server 140 is not needed to perform a backup or restore of a data object from/to primary storage 120, with all backup and restore functionality being performed by the client 110, the primary storage 120, and/or the backup storage 160. A deduplication and compression module 163 can deduplicate and/or compress each data object received from the primary storage 120. In an embodiment, whether a data object is compressed or deduplicated before backup, is determined by a backup policy. The deduplication and compression module 163, and the backup/restore service 164 use an API, software framework, one or more operation system calls, or one or more applications.

In an embodiment, functionality of the backup/restore service 164 can be split or shared as between the backup/restore API 114, primary storage 120, the backup/restore service 124, and/or the backup server 140 backup/restore service 144, to balance performance between the client 110, the primary storage 120, the backup server 140, and/or the backup storage 160.

In an embodiment, each of the primary storage 120 and the backup storage 160 can include any type of server or cluster of servers, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Further, each of the backup server 140, the primary storage 120 and the backup storage 160 may have a distributed architecture, or all of its components may be integrated into a single unit. For example, each of the primary storage 120 and the backup storage 160 may be implemented as part of a source storage available from EMC® Corporation of Hopkinton, Mass., such as the EMC® VMAX family of storage appliances.

Storage unit(s) 122 and 162 may be implemented locally (e.g., single node operating environment) or remotely (e.g., multi-node operating environment) via a bus and/or a network. In one embodiment, one of the storage units 122 can operate as an active storage to receive and store external or fresh user data, while the other storage unit 122 operates as a target storage unit to periodically archive data from the active storage unit according to an archiving policy or scheme. The storage units 122 and 162 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. The storage units 122 and 162 may also be combinations of such devices. In the case of disk storage media, the storage units 122 and 162 may be organized into one or more volumes of Redundant Array of Inexpensive Disks (RAID). Note that a source storage of a client may also be called the primary storage of the client to distinguish the storage from backup source storages.

The deduplication module 163 can be configured to segment the data file into multiple segments according to a variety of segmentation policies or rules. The deduplication module 163 only stores a segment in a storage unit 162 if the segment has not been previously stored in the storage unit. In the event that a segment has been previously stored, metadata can be used to reconstruct a file using the previously stored segment. As a result, segments of data files are stored in a deduplicated manner, either within each of storage units 162 or across at least some of storage units 162. Data stored in the storage units 162 may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

In an embodiment, the backup server 140 operating as a storage system may include or represent any type of servers or a cluster of one or more servers (e.g., cloud servers). For example, backup server 140 may be a storage server used for various different purposes, such as to provide multiple users or client systems with access to shared data and/or to back up (or restore) data (e.g., mission critical data).

Centralized Backup System

EMC Enterprise Copy Data Management (eCDM) is designed to address the copy data problem by delivering copy data management across primary and backup storage. eCDM provides self-service data management with global oversight to maximize efficiency, streamline operations, and ensure consistent service level compliance. eCDM can discover copies across an entire enterprise non-disruptively, automate service level objective (SLO) compliance, and optimize operations based on actionable insight. Using eCDM, storage administrators and database administrators can continue creating copies from their native interfaces (for example, Oracle RMAN).

eCDM can include a user interface to graphically display copy relationships, to enable organizations to eliminate redundant copies and maximize their use of existing resources. eCDM allows for the seamless access and recovery of copies off either a primary or a backup storage. By keeping only the right number of copies on the right storage devices, eCDM enables users to significantly reduce primary and backup storage costs while maintaining SLO compliance.

eCDM supports user defined service plans for monitoring or proactively managing SLO compliance. For example, storage administrators can create service plans for each department (e.g., Finance and Accounting) in an organization. Compliance for the service plans can be monitored by verifying whether the defined service level objectives are being met across the organization.

In an embodiment, to monitor or validate compliance with service plans, backups need to be discovered on either a primary storage or a backup storage or both.

Backup Discovery System

Figure 3:
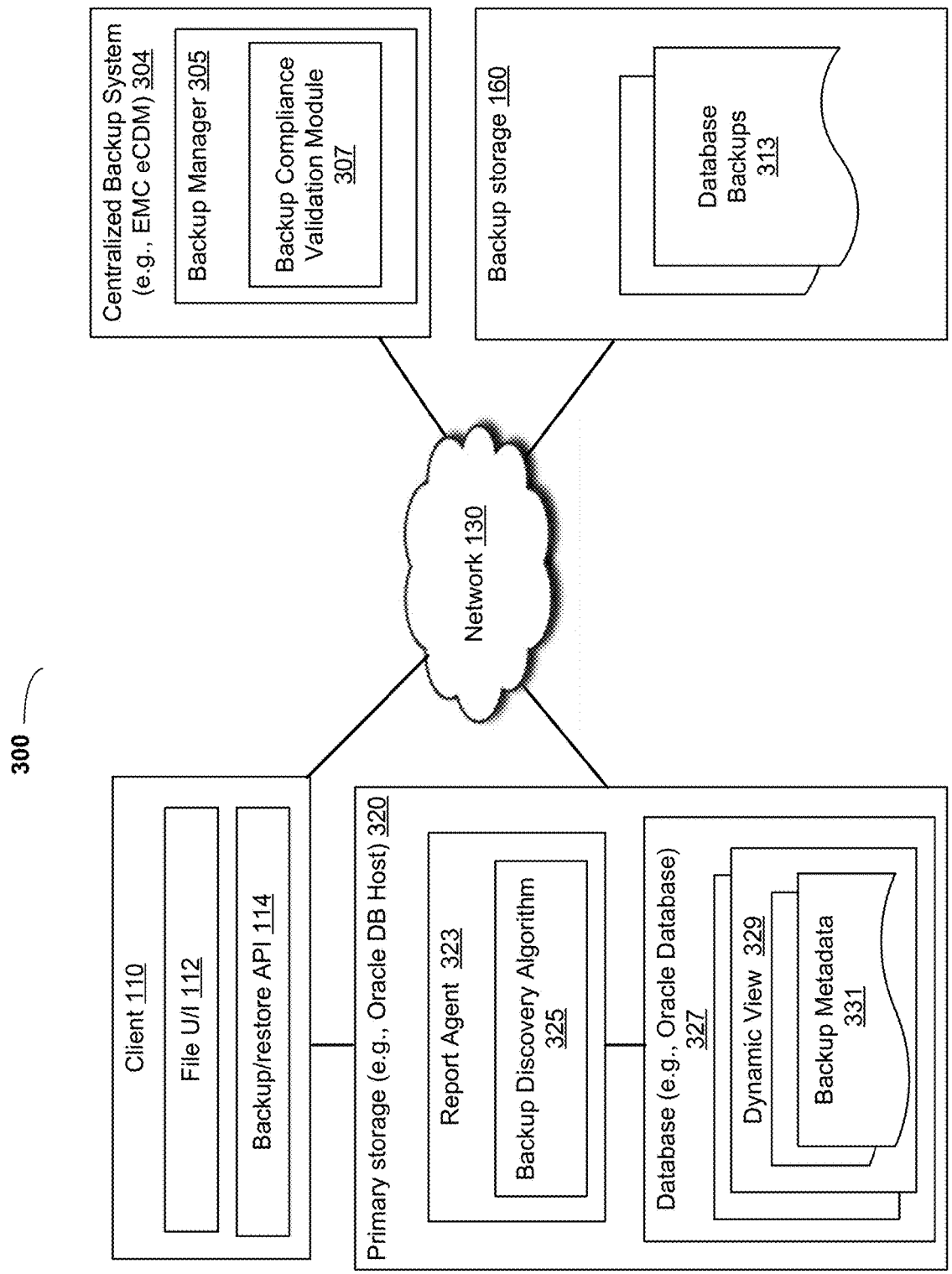
FIG. 3 illustrates, in block diagram form, a system for discovering backups from a database host, in accordance with an embodiment.

FIG. 3 illustrates, in block diagram form, a system for discovering backups from a database host, in accordance with an embodiment.

As shown in FIG. 3, a system 300 can include a primary storage 320, e.g., an Oracle database host, which can include a report agent 323 installed thereon. The report agent 323 can be a RMAN agent or another application. The report agent 323 can implement a backup discovery algorithm 325, which includes operations for discovering backups from a number of dynamic views, e.g., a dynamic view 329, in a database 327 on the primary storage 320.

In an embodiment, the database 327 can be an Oracle database, and can store data logically in tablespaces and physically in datafiles associated with the corresponding tablespace. The database 327 can include one or more tablespaces, which collectively store all data of the database. Each tablespace can include one or more datafiles, each of which is a physical structure that conforms to an operating system in which the database is running. The database can also include a control file, which contains information for the database, and which can be modified only by the database.

For example, a control file can include information describing tablespaces of the database, backup sets and backup pieces, backup datafiles and redo logs, datafile copies, and checkpoints. Each time a datafile or a redo log file is added to, renamed in, or dropped from the database, the control file is updated to reflect the physical structure change. The database can also include a server parameter file (spfile), a binary file that acts as a repository for initialization parameters of the database.

In an embodiment, when backup operations are performed on the database at various levels, backups can be generated, and metadata describing the backups can also be generated and recorded in the various dynamic performance views of the database. Each dynamic performance view can be a dynamic performance view prefixed with a "V$" or "GV$" in an Oracle database. The dynamic performance views are maintained by the database host that operates as the primary storage 320 or part of the primary storage 320. The dynamic performance views are accessible to a database administrator user SYS.

In an embodiment, the dynamic performance views are based on virtual tables built from database memory structures, and can record database activity. These views are dynamic, since they are continuously updated while the database is open and in use. The dynamic performance views can include information for system performance of the database; for example, system and session parameters, memory usage and allocation, file states (e.g., states of RMAN backup files), progress of jobs and tasks, SQL execution, information for data files, and one or more copies of the control file of the database.

In an embodiment, RMAN can perform online/offline backups of the database, and write backups 313 to a configured device, e.g., a device on the backup storage 160 in FIG. 1. Each backup generated by RMAN can include one or more backup sets, each of which can be a logical structure used to store backup data. A backup set can contain data from datafiles, archived redo logs, control files, or spfile; and can be in a proprietary format in which the backup tool writes backup files to disks, tape drives, tape libraries, or clouds. A backup set can contain one or more binary files in the proprietary format (e.g., an RMAN-specific format). Each of these files is a backup piece; RMAN can create one or more backup piece as output in a response to a backup command.

In an embodiment, when performing backup operations, RMAN can generate metadata 331 in the various dynamic performance views, e.g., dynamic view 329. The metadata can include a type of each backup piece in a backup, a backup level, a start time, an end time, a session key, and a system change number (SCN) of the backup piece.

In an embodiment, a backup piece type can be one of a variety of types, including a datafile type, a PDB (pluggable database) type, a CDB (container database) type, and a database type. A backup level can be one of spfile, controlfile, archivelog, full, incr0, incr1 or incomplete. A start up time is the time at which an RMAN backup command was run. An end time is the time the RMAN backup command was completed. A session key is the identifier for the RMAN session. A SCN can mean a number of things depending on the type of a backup piece.

In an embodiment, an RMAN backup script may contain commands used to back up the same type of database object. Despite the two backup commands, RMAN would record the two backups as single backup. For example, the backups generated by the command "backup pluggable database foo"

and "backup pluggable database bar" would be recorded as a single backup and would be reported as such.

In an embodiment, a control file contains all the information that can be used to map the backup to a correct thread, incarnation and point in time. For example, a control file can include a thread number, an incarnation number, a first SCN number, and a last SCN. The thread number can be the redo log thread number of the backup. For an archivelog backup, the thread number is the number of the thread whose logs are backed up; for backups other than an archivelog backup, the thread number is always 1. The incarnation number of the database can be the incarnation of the database at the time the backup was created. For an archivelog backup, the first SCN can be the earliest SCN contained in the backup; for backups other than an archivelog backup, the first SCN can be the earliest checkpoint SCN RMAN generated during the backup. For an archivelog backup, the last SCN can be the largest number amount all the next SCNs contained in the backup; for backups other than an archivelog backup, the last SCN number can be the last checkpoint SCN or fuzzy RMAN generated during the backup.

Archivelog backup can contain multiple ranges of SCNs stored in the archivelogs in the backup. Each range can be a composite value. For example, a backup includes three logs: Log 1: 10-20; Log 2: 20-30; and Log 3: 30-40, where the range after each log name (e.g., the range 10-20 after Log 1) is the range of transactions stored in the log. RMAN would report the three ranges as a single continuous range. If there are breaks in the log chain, there would be one range for each break. For a clustered database such as Oracle Real application Cluster (RAC), there can be one "scns" object for each thread (i.e. node) in the cluster. As a complete RAC archivelog backup, RMAN guarantees that there is no hole in the scns range across all threads.

As described above, backups generated by RMAN can be associated with metadata in a proprietary format to describe the backups. The metadata can be stored in various dynamic performance views. The report agent can be configured to gather the metadata and create a backup report to describe the backups.

Backup Discovery Algorithm

In an embodiment, the report agent can execute the operations defined in the backup discovery algorithm 325 to generate a backup report. The execution of the backup discovery algorithm 325 can be triggered by a request sent by a user through a user interface (not shown) on the backup manager 305 on a centralized backup system 304. The request can include one or more indications for requesting backup information that is required for validating a particular backup compliance plan; for example, the request may indicate that only information for those backups created during a particular time frame or meeting another criterion is needed.

In an embodiment, the report agent 323 can retrieve a control of the database, determine backup pieces for one or more backups based on the control file, and execute a SQL statement to query the dynamic performance views to gather information for the backup pieces for one or more backups that has completed without any warning or error. The report agent 323 ignores those backup pieces for one or more backups that are on-going or has warning or error, since the integrity and consistence of these backups cannot be guaranteed.

In an embodiment, information for each backup piece can be gathered from the following dynamic performance views: v$backup_set_details, v$database_incarnation, v$datafile, v$backup_spfile, v$backup_piece_details, v$backup_datafile, and v$rman_backup_subjob_details. In an embodiment, the backup level 1 (differential or cumulative backup) of a backup piece cannot be directly obtained from the dynamic performance views, the SQL statement should deduce it from its incremental level and the chain of the increment change number. Each of the dynamic performance views can be a virtual table with attributes/columns.

For example, the v$backup_piece_details view can include information for the name of each backup piece, the database host and the storage unit that the backup piece is stored on, when the writing for each backup piece started, when it completed, and the size of the backup piece. The v$rman_backup_subjobs_details view can include information for backup commands run in each RMAN job and the associated session, when each backup command started and completed, status of each backup command, and the type of data provided as input for each backup command. The v$backup_datafile view can include information for each Oracle datafile backed up; the information can be used by the report agent to find a start SCN and an end SCN of a backup. The v$rman_backup_job_details can include information for backup sessions, backup jobs in each session, a start time of the first backup command in a session, and an end time of the last backup in a session.

After gathering the information for the backup pieces for the one or more backups, the report agent can categorize the backup pieces into groups based on backup commands used to create the backup pieces and/or the backups. To be more specific, it is based on the combination of an RMAN session key, an RMAN subjob end time, and an RMAN copy number. Actually, similar commands in the same RMAN session will be merged into one subjob by Oracle. In an embodiment, different runs of a backup command have different RMAN session keys. In an embodiment, backup pieces created by different runs of the same backup command at different times will be placed into different groups, since they are generated for different backups. In an embodiment, RMAN merges similar backup commands within an RMAN session into a single subjob and create a single end time. In an embodiment, RMAN generates different copy numbers for different copies of the same backup. Since different copies have to be saved to different locations, they have to be reported as different backups. Each group can correspond to a backup, and the report agent can map each backup piece associated with a backup to the backup.

In an embodiment, the report agent 323 can label a backup "incomplete" as the backup level if the backup contains backup pieces with different backup levels. For example, if a database administrator performs a level 0 backup of a datafile in a new database, followed by an incr1 backup of the entire database, RMAN would perform an incr1 backup on the data file and an incr0 backup on the rest of files in the database. Since the backup levels on the backup pieces are different, the report agent 323 would mark the backup "incomplete".

Additional Information

In an embodiment, after mapping each backup piece to a backup, the report agent can derive additional information for the one or more backups from the information gathered from the dynamic performance views. The additional information can include a backup type of each backup, a backup level of each backup, and a start SCN and an end SCN of each backup.

In an embodiment, the backup type of each backup can be determined based on types of backup pieces in each backup.

Therefore, to determine the backup type of a backup, the report agent first needs to determine the types of the backup pieces in the backup.

In an embodiment, the type of a backup piece can be determined based on an input type used to create the backup piece. The input type of each backup piece can be gathered from either the v$rman_backup_subjobs_details view or from the v$rman_backup_job_details view.

The type of each backup piece can be determined using the following logic: If the input type contains DATAFILE, the type of the backup piece is "datafile". If the input type is ARCHIVELOG, the type of the backup piece is "archivelog". If the input type is CONTROLFILE, the type of the backup piece is "controlfile". If the input type is SPFILE, the type of the backup piece is "spfile". However, if the input type contains "DB", the type of the backup pieces would depend on an operation type associated with the backup command.

In an embodiment, the operation type of each backup piece can be gathered from either the v$rman_backup_subjobs_details view or from the v$rman_backup_job_details view.

For example, when the input type contains "DB", and the operation type is "BACKUP PLUGGABLE DATABASE", the report agent would check a container ID of the PDB (Pluggable database). If the container ID is 1, which indicates that the backup piece is part of a root container, the report agent would determine the type of the backup piece to be "cdb'. However, if the container ID is not 1, the type of the backup piece would be "pdb". If the input type contains "DB" and the operation type is not "BACKUP PLUGGABLE DATABASE", the report agent would determine the type of the backup piece to be "database".

With the type of each backup piece in a backup determined, the report agent can determine the type of the backup based on the types of the backup pieces in the backup. The report agent can determine the type of a backup based on the following rules: If a backup contains only backup pieces with the type of "controlfile" or "spfile", the type of the backup would be either "controlfile" or "spfile". However, if the backup additionally contains a backup piece of "pdb" or "cdb", the type of the backup type would be determined by the type of the additional backup piece. When a backup piece has the type "DB" in a backup, the entire backup would be of the type of "DB"; the existence of any "controlfile" or "spfile" backup piece in the backup does not affect the type of the backup. When a backup piece has the type "datafile" in a backup, the entire backup is "datafile"; the existence of any "controlfile" or "spfile" backup piece in the backup does not affect the type of the backup. If there is a "cdb" backup piece in a backup, the entire backup is "cdb". If there are only "pdb" backup pieces in a backup, the backup type is "pdb"; the existence of any "controlfile" or "spfile" backup piece in the backup does not affect the type of the backup.

The report agent also can determine the backup level of each backup based on backup levels of backup pieces in the backup. The backup level of each backup piece can be determined by the input type of the backup piece.

For example, if the input type contains SPFILE, the backup level of the backup piece would be "spfile". If the input type contains CONTROLFILE, the backup level would be "controlfile". If the input type contains ARCHIVELOG, the backup level would be "archivelog". If the input type contains the level FULL, the level would be "full". If the input type contains DIFFERENTIAL, the backup level would be "differential". If the input type contains CUMULATIVE, the backup level would be "cumulative".

To determine a backup level of a backup, the report agent can examine the backup levels of all backup pieces in the backup, and determine the backup level of the backup in accordance with the following rules: The backup level is "controlfile" or "spfile" when all the backup pieces in the backup are either all "controlfile" or all "spfile". If all backup pieces in the backup have the level "full", the backup would have the level "full". Otherwise, the backup would have the level of "incomplete". If a backup only contain backup pieces of "incr0", the backup piece would have the backup level "incr0". If a backup only contains backup pieces of "Differential", the backup would have the backup level of "differential". If a backup only contains backup pieces of "Cumulative", the backup would have the backup level of "cumulative". If "incr0", "differential" and "cumulative" backup pieces are mixed in a backup, the backup would have the backup level of "incomplete".

In an embodiment, by determining the backup type and backup level of a backup based on information (e.g., backup type and backup level) for each backup piece in the backup, the report agent enables the central backup system to validate backup compliance without simulating restore operations, since independencies among backups can be determined without performing the simulation operations.

In an embodiment, RMAN may generate backup pieces with different object types and levels for one backup command, backup pieces with different object types and levels will be put into different groups since the interdependencies of those groups are predefined in the centralized backup system 304. The centralized backup system 304 can use the predefined interdependency relationships to check the compliance. In an embodiment, the SCN range of a backup group is determined by the minimum SCN and the maximum SCN of all backup pieces in the group.

In an embodiment, the report agent also operates to derive a start SCN and an end SCN of each backup using information from the v$backup_datafile view, which contains the columns of "checkpoint_change #" and "absolute_fuzzy_change #" that respectively specify the start and end SCNs of a file in a backup piece. The report agent can use the information to determine the start SCN and the end SCN of a backup. The start SCN for the entire backup can be determined by calculating the lowest start SCN of all the backup pieces, and the end SCN of the entire backup can be determined by calculating the highest end SCN of all the backup pieces.

In an embodiment, the report agent can subsequently construct a backup report that includes information for each backup created during a particular timeframe or meeting another predetermined standard. The backup report can include all the backup pieces in a particular backup, a backup type, a backup level, a start SCN (system change number) and an end SCN of each backup, and any other information the report agent can be configured to derive from the metadata information gathered from the number of dynamic performance views in response to a user request. The backup report can be transmitted to the backup compliance validation module 307 in the centralized backup system 304 for backup compliance validation.

Backup Compliance Validation

In the centralized backup system, an algorithm is used to determine if a backup is self-contained. A self-contained backup has no interdependency relationship with other backups. If the backup is not self-contained, the centralized backup system can use another algorithm to identify its interdependencies with other backups. As a precondition, the centralized backup system defines backup types as "DB", "pdb", "cdb", "datafile", and defines backup levels as "full", "incr0", "cumulative", "differential", "spfile", "control file", "archivelog" and "incomplete". To any backup depending on "archivelog" backup, its SCN range needs to be covered by the SCN range of "archivelog" backup.

In an embodiment, these backup types represent different granularities of backups. For example, a "DB" backup type can represent a backup for an entire database, a "pdb" backup type can represent a backup for a single PDB in a container database (CDB), and a "datafile" backup type can represent a backup for a datafile in a database or PDB. A database can contain multiple datafiles and a CDB; and a CDB can further contain multiple PDBs, each of which can contain many datafiles. The centralized backup system can use the backup types to create, restore, and/or validate backups at different granularities.

In an embodiment, the centralized backup system also defines interdependencies and/or dependencies among backups of different types and backup levels. The centralized backup system can use a backup for backup compliance validation only when all the dependencies of the backup are located. In an embodiment, although a backup with all dependencies located is restorable, the centralized backup system does not need to restore the backup to use the backup for compliance validation.

Table 1 below illustrates the interdependencies/dependencies among different types of backups. The table is provided for illustration purpose and does not list all the backup types.

TABLE 1

| Backup Level | Backup Type | |
|---|---|---|
| | DB | PDB |
| full | ('DB' + 'Spile') And ('DB' + 'control file') And ('DB' + 'archivelog') | ('DB' + 'Spile') And ('DB' + 'control file') And ('DB' + 'archivelog') |
| Incr0 | ('DB' + 'Spile') And ('DB' + 'control file') And ('DB' + 'archivelog') | ('DB' + 'Spile') And ('DB' + 'control file') And ('DB' + 'archivelog') |
| cumulative | ('DB' + 'Spile') And ('DB' + 'control file') And ('DB' + 'archivelog') And ('DB' + 'incr0') | ('DB' + 'Spile') And ('DB' + 'control file') And ('DB' + 'archivelog') And ('DB' + 'incr0') |
| differential | ('DB' + 'Spile') And ('DB' + 'control file') And ('DB' + 'archivelog') And ('DB' + 'incr0') And ('DB' + 'differential') | ('DB' + 'Spile') And ('DB' + 'control file') And ('DB' + 'archivelog') And ('DB' + 'incr0') And ('DB' + 'differential') |
| spfile | NONE | N/A |
| controlfile | ('DB' + 'control file') | N/A |
| archivelog | NONE | N/A |
| incomplete | NONE | NONE |

As in Table 1, backups of various backup types and backup levels are provided with their interdependencies specified in the cells. For example, a backup with the backup type "DB" and the backup level "full" can have multiple dependency backups (dependencies), including a backup with the backup type "DB" and backup level "Spfile", a backup with the backup level "DB" and backup level "control file", and a backup with the backup "DB" and backup level "archivelog". As also shown in Table 1, a backup with the backup type "DB" and backup level "Spile" does not have any dependency backup; i.e., the backup is self-contained.

Figure 4:
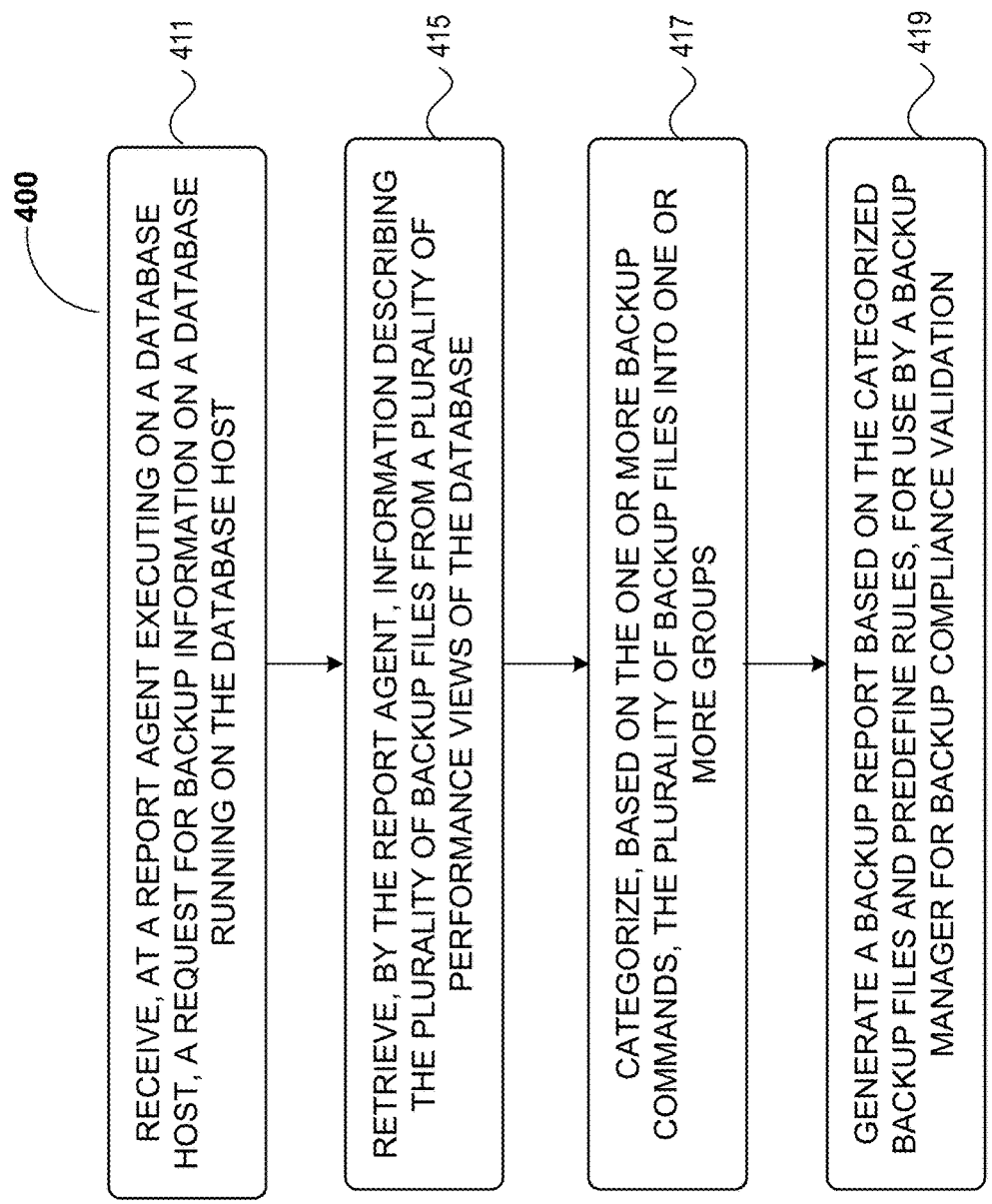
FIG. 4 illustrates an example process for discovering backups from a database host, in accordance with an embodiment.

FIG. 4 illustrates an example process for discovering backups from a database host, in accordance with an embodiment.

As shown in FIG. 4, process 400 can be performed by software, hardware, or a combination thereof. For example, the process 400 can be performed by the report agent 323 in the example system 300 described in FIG. 3.

As shown in FIG. 4, in operation 411, a request for a backup report is received at a report agent running on a database host, to request information for one or more backups of a database running on the database host. The request can include one or more indications for requesting backup information that is required for validating a particular backup compliance plan; for example, the request may indicate that only information for those backups created during a particular time frame or meeting another criterion is needed.

In operation 415, the report agent can connect to the database and retrieve, from dynamic performance views, information for backup pieces/backup files for the one or more backups. The dynamic performance views are dynamically generated. The backup pieces are registered within the dynamic performance views. The plurality of backup files are generated by a backup tool when creating one or more backups of the database, and the information includes attributes of one or more backup commands used by the backup tool to create the one or more backups.

In operation 417, the report agent can categorize the backup files into one or more groups based on the one or more backup commands. Since the same command can be used to create the backup and each backup piece therein, backup pieces created by different runs of the same backup command at different times can be placed into different groups.

In operation 419, the report agent can generate a backup report based on the categorized backup files and predefined rules, and transmit the backup report to a backup compliance validation module in a centralized backup system for validating whether a particular service level objective (SLO) has been met. The backup report can be in a variety of formats, including JavaScript Object Notation (JSON), XML, or plain text, and can map backup files for each backup to that backup. The backup report can include additional information for each backup, for example, the backup level for the backup, a start time when a backup command was run to generate the backup, an end time when the backup command was completed, and a session key of a backup command in a particular backup session. The backup report can also include a backup type, a backup level, a start SCN (system change number) and an end SCN of each backup.

Figure 5:
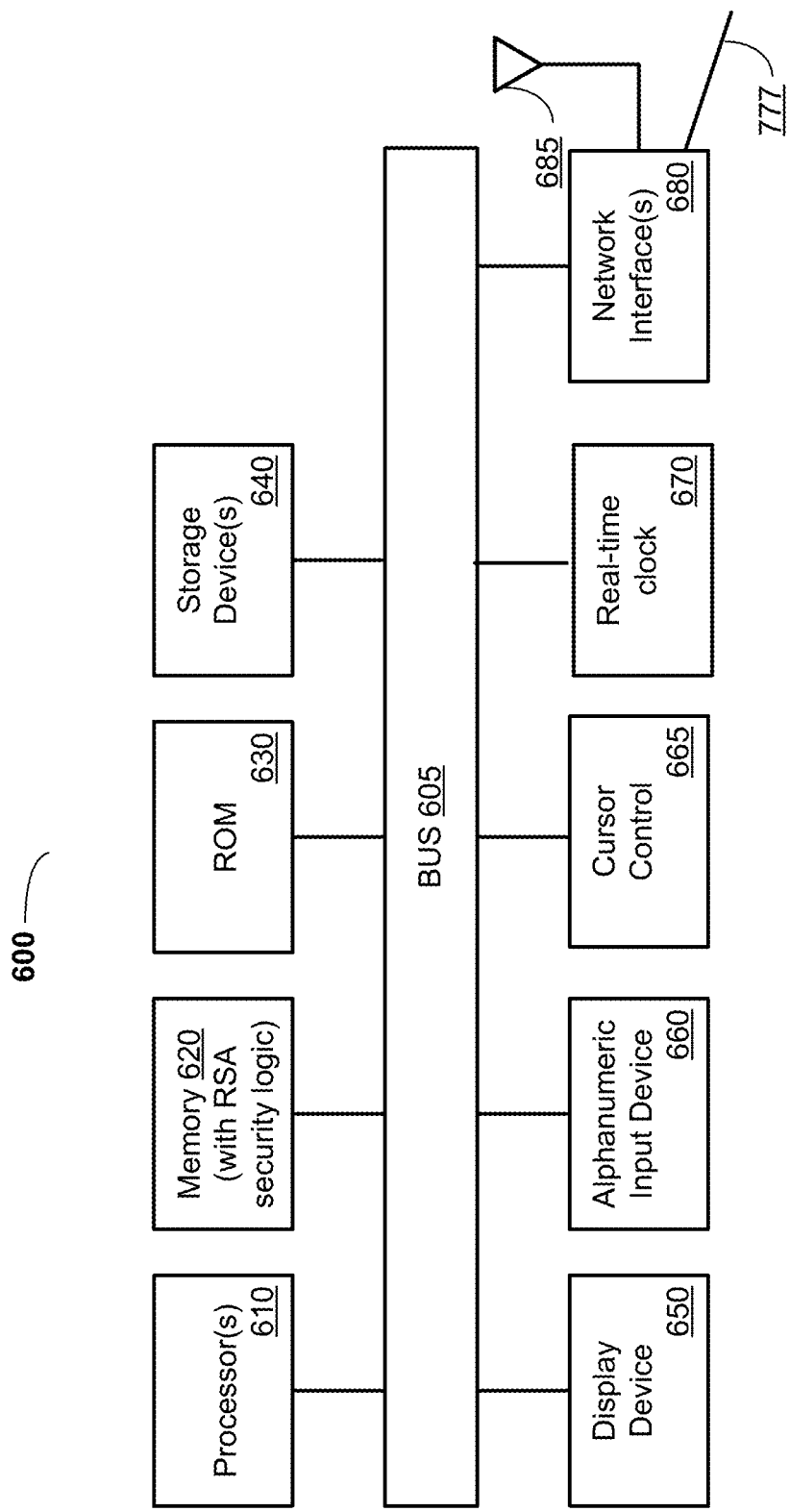
FIG. 5 is a block diagram illustrating an example of a data processing system which may be used with any embodiment of the invention.

FIG. 5 is a block diagram illustrating an example of a data processing system which may be used with any embodiment of the invention.

In FIG. 5, computing system 600 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 5 may be used to provide a computing device and/or a server device.

Computing system 600 includes bus 605 or other communication device to communicate information, and processor 610 coupled to bus 605 that may process information.

While computing system 600 is illustrated with a single processor, computing system 600 may include multiple processors and/or co-processors 610. Computing system 600 further may include random access memory (RAM) or other dynamic storage device 620 (referred to as main memory), coupled to bus 605 and may store information and instructions that may be executed by processor(s) 610. Main memory 620 may also be used to store temporary variables or other intermediate information during execution of instructions by processor 610. Main memory 620 can further include executable programs, application programming interfaces (APIs), frameworks, and other executable program code to implement the RSA security logic described herein.

Computing system 600 may also include read only memory (ROM) 630 and/or other static, non-transitory storage device 640 coupled to bus 605 that may store static information and instructions for processor(s) 610. Data storage device 640 may be coupled to bus 605 to store information and instructions. Data storage device 640 such as flash memory or a magnetic disk or optical disc and corresponding drive may be coupled to computing system 600.

Computing system 600 may also be coupled via bus 605 to display device 650, such as a light-emitting diode display (LED), liquid crystal display (LCD), or touch screen display to display information to a user. Computing system 600 can also include an alphanumeric input device 660, including alphanumeric and other keys, which may be coupled to bus 605 to communicate information and command selections to processor(s) 610. Another type of user input device is cursor control 665, such as a touchpad, a mouse, a trackball, or cursor direction keys to communicate direction information and command selections to processor(s) 610 and to control cursor movement on display 650. Computing system 600 may further include a real-time clock 670. The real-time clock 670 may be used for generating date/time stamps for data records, computing elapsed time, and other time-keeping functions. A real-time clock 670 can be a battery-backed chipset with a settable date and time. Alternatively, a real-time clock 670 may include logic to retrieve a real-time from a network source such as a server or an Internet server via network interfaces 680, described below. Real-time clock 670 can be used to determine a period for RSA token regeneration, such as 24 hours.

Computing system 600 further may include one or more network interface(s) 680 to provide access to a network, such as a local area network. Network interface(s) 680 may include, for example, a wireless network interface having antenna 685, which may represent one or more antenna(e). Computing system 600 can include multiple wireless network interfaces such as a combination of WiFi, Bluetooth® and cellular telephony interfaces. Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method for discovering database backups, the method comprising:
implementing a report agent executing on a database host, the report agent collecting metadata of backups and generating a backup report by the steps of:
receiving, at the report agent, a request for backup information on a database running on the database host;
retrieving, by the report agent, information describing a plurality of backup files from a plurality of dynamic performance views of the database, wherein the plurality of backup files are generated by a backup tool when creating one or more backups of the database, wherein the information includes attributes of one or more backup commands used by the backup tool to create the one or more backups;
categorizing by the report agent, based on the one or more backup commands, the plurality of backup files into one or more groups;
generating by the report agent a backup report based on the categorized backup files and predefined rules, for use by a backup manager for backup compliance validation of whether a particular backup plan or policy has been satisfied, wherein the backup report maps the plurality of backup files to the one or more backups.

2. The method of claim 1, wherein the plurality of backup files are categorized into the one or more groups based on a session key, a start time or end time of a sub job, and a copy number, wherein the sub job includes a plurality of backup commands in a backup session identified by the session key, wherein the plurality of backup commands share at least one attribute.

3. The method of claim 1, wherein each of the plurality of backup files is a binary file that is in a format proprietary to the database.

4. The method of claim 1, wherein the information describing the plurality of backup files is retrieved using a structured query language (SQL), statement and stored in a cache for analysis by the report agent.

5. The method of claim 1, wherein the report agent further performs one or more of the following operations when generating the backup report:
determining backup types of backup pieces in each of the one or more backups, determining backup levels of the backup pieces in the backup,
determining a backup type of the backup based on the backup type of each backup piece in the backup,
determining a backup level of the backup based on the backup level of each backup piece in the backup,
determining a start system change number (SCN) and an end SCN of each backup piece in the backup, and determining a start SCN and an end SCN of the backup.

6. The method of claim 5, wherein the backup report includes one or more of the backup type, the backup level, the start SCN or the end SCN of the backup, wherein the start SCN of the backup is the minimum SCN in the backup and the end SCN is the maximum SCN in the backup.

7. The method of claim 5, wherein the backup report is a JavaScript Object Notation (JSON) or extensible markup language (XML), file that includes one or more of the backup type, the backup level, the start SCN or the end SCN of the backup.

8. The method of claim 5, wherein the backup type of the backup represents the granularity of the backup, and enables the backup manager to validate the backup compliance at different granularities.

9. The method of claim 5, wherein the backup type and backup level of the backup provides interdependency information of the backup on one or more other backups, wherein the interdependency information enables the backup manager to validate backup compliance without simulating restore operations.

10. The method of claim 5, wherein the backup level of the backup is an incomplete type if it cannot be determined, wherein the incomplete backup level is ignored for backup compliance validation.

11. A system for discovering database backups, comprising:
a processor; and
a memory coupled to the processor to store instructions, which when executed by the processor, cause the processor to perform the steps comprising:
implementing a report agent executing on a database host, the report agent collecting metadata of backups and generating a backup report by the steps of:
receiving, at the report agent, a request for backup information on a database running on the database host,
retrieving, by the report agent, information describing a plurality of backup files from a plurality of dynamic performance views of the database, wherein the plurality of backup files are generated by a backup tool when creating one or more backups of the database, wherein the information includes attributes of one or more backup commands used by the backup tool to create the one or more backups,
categorizing, by the report agent, based on the one or more backup commands, the plurality of backup files into one or more groups, and
generating by the report agent a backup report based on the categorized backup files, for use by a backup manager for backup compliance validation of whether a particular backup plan or policy has been satisfied, wherein the backup report maps the plurality of backup files to the one or more backups.

12. The system of claim 11, wherein the plurality of backup files are categorized into the one or more groups based on a session key, a start time or end time of a sub job, and a copy number, wherein the sub job includes a plurality of backup commands in a backup session identified by the session key, wherein the plurality of backup commands share at least one attribute.

13. The system of claim 11, wherein each of the plurality of backup files is a binary file that is in a format proprietary to the database.

14. The system of claim 11, wherein the information describing the plurality of backup files is retrieved using a structured query language (SQL) statement and stored in a cache for analysis by the report agent.

15. The system of claim 11, wherein the report agent further performs one or more of the following operations when generating the backup report:
determining backup types of backup pieces in each of the one or more backups, determining backup levels of the backup pieces in the backup,
determining a backup type of the backup based on the backup type of each backup piece in the backup,
determining a backup level of the backup based on the backup level of each backup piece in the backup, and
determine a start system change number (SCN) and an end SCN of the backup.

16. The system of claim 15, wherein the backup report is a JavaScript Object Notation (JSON) or extensible markup language (XML) file that includes one or more of the backup type, the backup level, the start SCN or the end SCN of the backup.

17. The system of claim 15, wherein the backup type of the backup represents the granularity of the backup, and enables the backup manager to validate the backup compliance at different granularities.

18. The system of claim 15, wherein the backup type and backup level of the backup provides interdependency information of the backup on one or more other backups, wherein the interdependency information enables the backup manager to validate backup compliance without simulating restore operations.

19. A non-transitory machine-readable medium having instructions stored therein, which when executed by a processor, cause the processor to perform operations for discovering database backups, the operations comprising:
implementing a report agent executing on a database host, the report agent collecting metadata of backups and generating a backup report by the steps of:
receiving, at the report agent, a request for backup information on a database running on the database host;
retrieving, by the report agent, information describing a plurality of backup files from a plurality of dynamic performance views of the database, wherein the plurality of backup files are generated by a backup tool when creating one or more backups of the database, wherein the information includes attributes of one or more backup commands used by the backup tool to create the one or more backups;
categorizing by the report agent, based on the one or more backup commands, the plurality of backup files into one or more groups;
generating by the report agent a backup report based on the categorized backup files and predefined rules, for use by a backup manager for backup compliance validation of whether a particular backup plan or policy has been satisfied, wherein the backup report maps the plurality of backup files to the one or more backups.

20. The non-transitory machine-readable medium of claim 19, wherein the plurality of backup files are categorized into the one or more groups based on a session key, a start time or an end time of a sub job, and a copy number, wherein the sub job includes a plurality of backup commands in a backup session identified by the session key, wherein the plurality of backup commands share at least one attribute.

21. The non-transitory machine-readable medium of claim 19, wherein each of the plurality of backup files is a binary file that is in a format proprietary to the database.

* * * * *